United States Patent [19]

Bongers et al.

[11] Patent Number: 4,982,990
[45] Date of Patent: Jan. 8, 1991

[54] RAIL WHEEL

[75] Inventors: Bernd Bongers, Kirchheim; René Meurer, Munich; Walter Oefner, Otterfing; Klaus Rode, Disenhofen; Georg Maier, Isen, all of Fed. Rep. of Germany

[73] Assignee: Messerschmitt-Bölkow-Blohm GmbH, Munich, Fed. Rep. of Germany

[21] Appl. No.: 336,703

[22] Filed: Apr. 12, 1989

[30] Foreign Application Priority Data

Apr. 28, 1988 [DE] Fed. Rep. of Germany ....... 3814343

[51] Int. Cl.$^5$ .......................... B60B 17/00; B60B 5/02
[52] U.S. Cl. ........................................ 295/21; 295/23; 301/31; 301/63 PW
[58] Field of Search ..................... 295/1, 8, 21, 23, 30, 295/11, 22, 25, 26; 301/63 PW, 63 DD, 30, 31

[56] References Cited

U.S. PATENT DOCUMENTS

| 809,398 | 1/1906 | Richards | 295/21 X |
|---|---|---|---|
| 4,571,005 | 2/1986 | Nowak et al. | 301/63 PW |
| 4,699,417 | 10/1987 | Spiller et al. | 295/23 X |
| 4,863,207 | 9/1989 | Wackerle et al. | 301/63 DD X |

FOREIGN PATENT DOCUMENTS 810993 8/1951 Fed. Rep. of Germany ........ 295/26

Primary Examiner—Russell D. Stormer
Attorney, Agent, or Firm—Kenyon and Kenyon

[57] ABSTRACT

In order to attain a cost-effective manufacturing, suitable for large-scale production, in the case of a rail wheel, and, at the same time, a high degree of structural strength, whereby the wheel disk, which rigidly joins the wheel hub (4) with the wheel tire in a fibrous composite type of construction, is made of two external fibrous composite surface layers and a characteristically light inner core, which transmits shearing force, arranged between them, the inner core is composed, according to the invention, of ring segment-shaped, foam plastic-filled fibrous composite hollow cases (22), each consisting of web portions (28), running radially between the wheel hub and the wheel tire, arranged perpendicularly to the surface layers, with an intersecting fibrous orientation, slanted at an angle to the longitudinal direction of the sections, as well as profile side walls (30), formed in one piece, on the longitudinal edges of the web portions, with a continuous fibrous structure, each evenly bonded with the inner surface of the surface layers, and of segment extensions (32, 34), lying contiguously, in one piece, on the web portion ends, forming the outer and inner surrounding edges of the hollow cases.

14 Claims, 4 Drawing Sheets

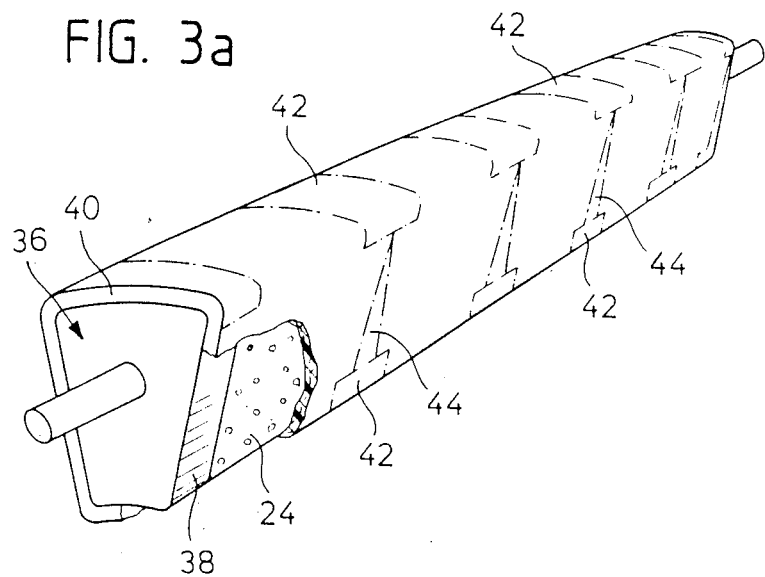

RAIL WHEEL

FIELD OF THE INVENTION

The invention relates to a rail wheel, and, more particularly, to a rail wheel of the type comprising a wheel hub, a wheel tire and a wheel disk rigidly joining the wheel hub and wheel tire and being of a fibrous composite type of construction including external fibrous composite surface layers and a relatively light inner core.

BACKGROUND OF THE INVENTION

In the above-described type of rail wheel, the fibrous composite structure, which constitutes the wheel disk, must transfer, in addition to the radial contact loads of the wheel and the braking and accelerative forces acting in the circumferential direction, strong transverse forces, acting parallel to the wheel axis, between the hub and the wheel tire. Accordingly, the fibrous composite structure of the wheel disk must possess a correspondingly high flexural strength. This is achieved in the known disk wheels of this type (See, e.g., German Patent No. 33 45 555 and European Patent No. 65 086), wherein the wheel disk is designed with a sandwich construction, with a characteristically light inner core of metal honeycombs or foam plastic material, which joins the outer fibrous composite surface layers, in a shear-resistant manner, at a distance to each other. Such an inner core, irrespective of whether it consists of metal honeycombs or of a foam plastic material of sufficient strength, is so expensive, that the application of rail wheels of this construction type is only possible to a limited extent, in spite of their superior qualities as compared to standard all-metal rail wheels.

It is a primary object of the present invention to design a rail wheel of the fibrous composite structure type which has a cost effective type of construction, suitable for large-scale production, and, while maintaining a low true specific weight, provides significant structural strength in the area of the fibrous composite wheel disk.

SUMMARY OF THE INVENTION

According to the present invention, the inner core of the wheel disk comprises radially extending shear resistant fibrous composite profile sections configured about web portions. As a result of the radial fibrous composite profile sections, arranged in the inner core, each consisting of high-grade shear-resistant web portions, which are bonded to the surface layers, over a large surface of the profile side walls, a wheel disk is obtained, which, at a low structural weight, possesses a very high structural strength, specifically conforming to the acting loads. The inner core according to the present invention has the exceptional feature that the fibrous composite profile sections can be produced in a functionally efficient manner and are significantly less expensive than the cores made of foam plastic material or honeycomb, as are usually required for wheel disks of the same strength.

In accordance with a feature of the present invention, the fibrous composite sections are expediently provided, at their extremity, with one-piece extensions, which extend over each of the outer and inner rims of the inner core, in the circumferential direction, between the surface layers. This makes it possible to attain a selective, local strengthening in the area of the force introducing zones, on the wheel tire side and hub side of the wheel disk.

An especially preferred embodiment of the invention comprises two adjacent fibrous composite sections, including their extensions, which are designed as a hollow case in one piece, which, in its cross section, is substantially ring-segment shaped. Such a hollow case fibrous composite structure of the inner core considerably increases the structural rigidity of the wheel disk. The cavities of the inner core, which are free of fibrous composite material, may be filled with an inexpensive material of relatively low strength, namely, preferably, foam plastic. In order to increase the strengthening effect of the hollow cases to a greater degree, these cases are preferably arranged side-by-side, without gaps, in the circumferential direction of the inner core and bonded to each other. To increase rigidity as well, and to retain as large a bonding surface as possible between the hollow cases and the surface layers, the profile side walls of the hollow cases are expediently designed so that their width increases in the radial direction of the inner core, extending up to the median plane of the hollow case.

An important aspect of the invention, with regard to the advantages of mass production, according to which, the hollow cases, including their foam plastic cores, are manufactured using a winding process. Pursuant to this feature of the invention, an oblong winding mandrel, which is alternately composed of foam plastic pieces and separator pieces with a cross section configuration, corresponding to the inner cross section of the hollow cases, is covered throughout with winding laminate. The winding laminate is separated in the area of the separator pieces and cut to size, and the winding laminate sections, which are unsupported after removing the separator pieces, are folded down as profile side walls on the respective foam plastic pieces. The aim, hereby, is to manufacture the hollow cases in large quantities with minimal manufacturing expenditure, whereby the hollow cases, configured in this manner, are expediently joined in the unhardened state to form the inner core and jointly hardened, to provide further efficiency in the manufacturing process according to the invention.

An especially suitable embodiment of the invention, with regard to a high load resistance for the rail wheel, relates to the connection of the fibrous composite wheel disk to the wheel tire by means of a high grade positive coupling. Pursuant to this feature of the invention, in order to provide a high-grade coupling, secure against shearing force, the wheel disk is preferably bonded to the wheel tires, as well as positively coupled in a non-slip manner in the axial direction. To provide the non-slip security arrangement, a fibrous composite ring, which engages a circular groove of the wheel tire and is bonded to it, is expediently provided, which preferably has a fibrous layer tapering construction to reduce peak stresses.

With regard to a design suitable for large-scale production, but also to strengthen the wheel disk locally, in the area of the rim connection on the side of the wheel tire, it is also recommended to manufacture both surface layers jointly as a one-piece fibrous composite-winding laminate, extending over the outer and both side surfaces of the inner core. The one-piece fibrous composite-winding laminate has a fibrous orientation, winding around the hub and running from the hub tangentially to the outside, and a wall thickness, which decreases radially to the outside. The radial forces, acting hereby in the plane of the surface layers, are at least partially transferred by the surface compression between the wheel disk and wheel hub, so that one can dispense with expensive bonding lugs in the hub area. The fibrous composite laminate, which forms the surface layers, is preferably wound on both sides of the hub in the winding area, in groove-type depressions designed therein, whereby in a simple manufacturing process, also in the area of the hub, again a positively coupling non-slip, axial security arrangement on both sides of the wheel disk is attained without necessitating a split hub.

Finally, in a further embodiment of the invention, it is possible to also provide wheel disks of a truncated-cone shaped design with a winding laminate, which forms a surface layer, resting properly on both side surfaces of the inner core.

For a better understanding of the above and other features and advantages of the present invention, reference should be made to the following detailed description and to the accompanying drawings.

BRIEF DESCRIPTION OF THE DRAWINGS

FIGS. 3(a)-(c) illustrate the design of a winding laminate utilized to manufacture the hollow cases of FIG. 2.

DETAILED DESCRIPTION

Figure 1:
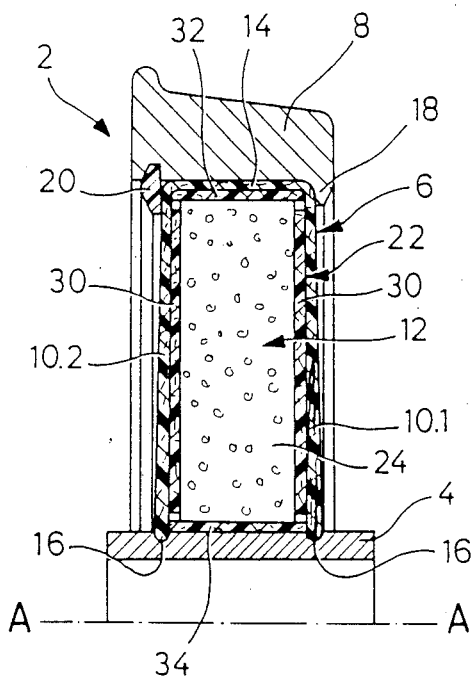
FIG. 1 is a side cross-sectional view of a rail wheel, according to the invention, including a wheel disk of a fibrous composite type of construction.

According to FIG. 1, a rail wheel 2 having a wheel axis A comprises a metal wheel hub 4, a wheel disk 6 of the fibrous composite type of construction, and a wheel tire 8 of metal.

The wheel disk 6 comprises external fibrous composite surface layers 10.1 and 10.2 and an inner core 12 arranged between them, which transfers the shearing forces acting upon the rail wheel 2. The surface layers 10.1 and 10.2 are formed by a wound fibrous composite laminate 14, which extends, in one piece, over the side surfaces and the external cylindrical surface of the inner core 12. The composite laminate 14 engages depressions 16 formed in the wheel hub 4, which depressions 16 are designed as circular grooves, one on each side of the inner core 12. In order to provide a load resistant coupling between the wheel disk 6 and the wheel tire 8, the surface layer laminate 14 is bonded first of all to the inner surface of the wheel tire 8 and, secondly, a positively coupling non-slip security arrangement is provided, which is configured on one side of the wheel disk 6 as a stop collar 18, formed on the wheel tire 8, and on the other side, as a fibrous composite ring 20, designed in multisections for fitting purposes. The composite ring 20 is received in and is bonded to a circular groove formed on the inner surface of the wheel tire 8.

To strengthen the wheel disk 6, especially relative to the shearing forces acting on the hub 4 and the wheel tire 8, parallel to the wheel axis A, the inner core 12 contains a configuration, in the circumferential direction, of adjacent, single-piece hollow cases 22 of fibrous composite material, each one of which has a ring segment-shaped cross section and is provided, in the interior, with a foam plastic filling 24, of for example polyurethane foam plastic.

Figure 2:
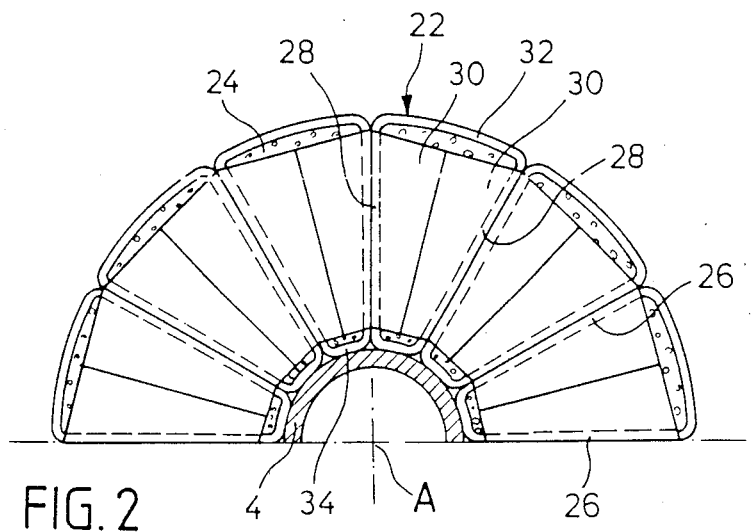
FIG. 2 is a top view of the inner core of the wheel disk of FIG. 1, including the hollow cases of the inner core.
Figure 3B:
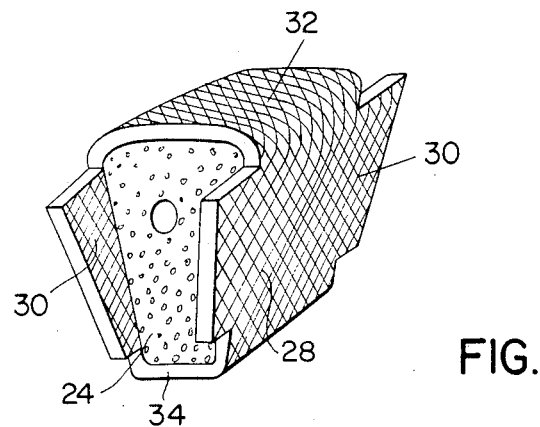
Figure 3C:
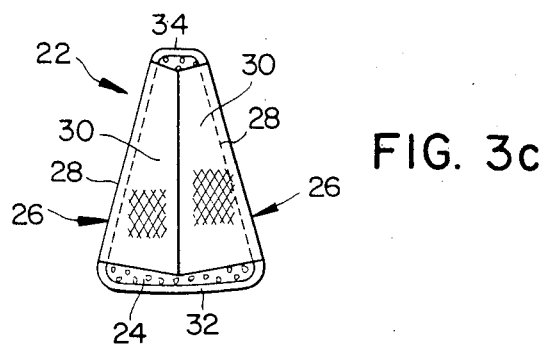

As illustrated in FIGS. 1, 2 and 3c, each hollow case 22 includes two fibrous composite profile sections 26, running from the wheel hub 4 to the wheel tire 8, radially relative to the wheel axis A. Each of the fibrous composite sections 26 comprises a web portion 28, aligned perpendicularly to the surface layers 10, and profile side walls 30, which are formed in one piece on the upper and lower longitudinal edges of the web portions and evenly bonded to the inside of the surface layers 10. As a result of segment extensions 32 and 34 at the extremities, extending in the circumferential direction and forming the rim portions of the hollow case 22 on the side of the wheel tire and the hub, respectively, both fibrous composite sections 26 are connected to each other in one piece and have a continuous fibrous structure. The width of the profile side walls 30 expands in the radial direction, and each one reaches the median plane of the hollow case 22, so that the foam plastic-filled case interior is almost completely surrounded by the fibrous composite sections 26. The fibrous composite sections 26 possess a uniform fibrous structure with a fibrous orientation adjusted relative to the longitudinal direction of the webs 28 at a ±45 degree angle slant. However, to increase the radial strength of the profile walls, a small fibrous portion of the hollow cases 22, namely not more than approximately 20%, can feature a fibrous orientation in the longitudinal direction of the segment, in other words in the circumferential direction of the case 22, and/or to achieve specific laminate features, it can feature a fibrous orientation, substantially perpendicular to the longitudinal direction of the web portion.

According to FIG. 3, the hollow cases 22, including the foam plastic fillers 24, are manufactured using a winding process suitable for large-scale production. Pursuant to the invention, a plurality of prefabricated foam plastic fillers 24 are mounted on a winding mandrel 36. Separator pieces 38 are arranged in alternating sequence between the plastic fillers 24. The separator pieces are formed to the same cross-sectional shape as the foam plastic fillers 24 and are twice as long as the profile side walls 30 are wide. The winding mandrel 36 is wound throughout with a winding laminate 40, which possesses an intersecting fibrous orientation, slanted ±45 degrees to the longitudinal mandrel axis, with small proportional amounts being wound, for the above mentioned reasons, in the circumferential direction of the winding mandrel 36, or with a minimal angle of inclination of 5 to 15 degrees to the longitudinal mandrel axis.

After winding the mandrel 36 up to a laminate thickness, corresponding to the thickness of the case walls, the winding laminate 40 is split in the area of the separator pieces 38 by means of a cutting and punching apparatus (not shown), along the cut line represented with a dotted line in FIG. 3a. In this manner, rectangular laminate cut out sections 42 are cut at the upper and lower sides of the mandrel 36 and between these, on the lateral side of the mandrel 36, wedge-shaped laminate cut out sections 44 are also cut. To facilitate the punching and cutting operation, the separator pieces 38 are provided with grooves or strips of an elastomer material, in the area of the laminate cuts. The foam plastic pieces 24 and the separator pieces 38 are removed in alternating sequence from the winding mandrel 36, according to the cut, in a way, so that the laminate between the individual cuts remains on the respective foam plastic piece 24, which it encases (FIG. 3b). The tab-shaped winding laminate sections, which, based on the pattern, protrude over the foam plastic piece 24, are subsequently folded down to form the profile side walls 30, which rest on the foam plastic piece 24 (FIG. 3c).

In the configuration as shown in FIG. 2, the cases 22 are joined, in an unhardened state, in a form tool, in which the hub 4 can also be integrated, and subsequently, while jointly bonding their adjacent web portions 28, jointly hardened to a finished inner core 12.

Figure 4A:
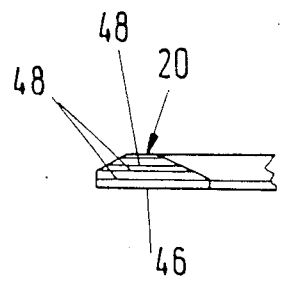
FIGS. 4(a), (b) illustrate the lateral section shape of a fibrous composite retaining ring and the requisite tools to form the retaining ring.
Figure 4B:
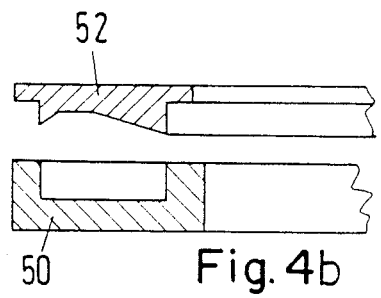

FIGS. 4(a) and (b) illustrate the manufacture of the fibrous composite retaining ring 20, which is tapered in the cross-section, with a laminate stratification 48, parallel to the side surface 46 of the ring 20 (FIG. 4a). The manufacturing operation is accomplished in a ring-shaped fitting tool 50 with a corresponding press die 52, shown in cross-section in FIG. 4b, in which fibrous-composite prepreg bands or tubes are inserted with a ±45 degree angle fibrous orientation, relative to the longitudinal band direction, and hardened after closing the press die 52. The retaining ring 20, which initially is still closed in the circumferential direction, is ready for installation after being separated.

Figure 5:
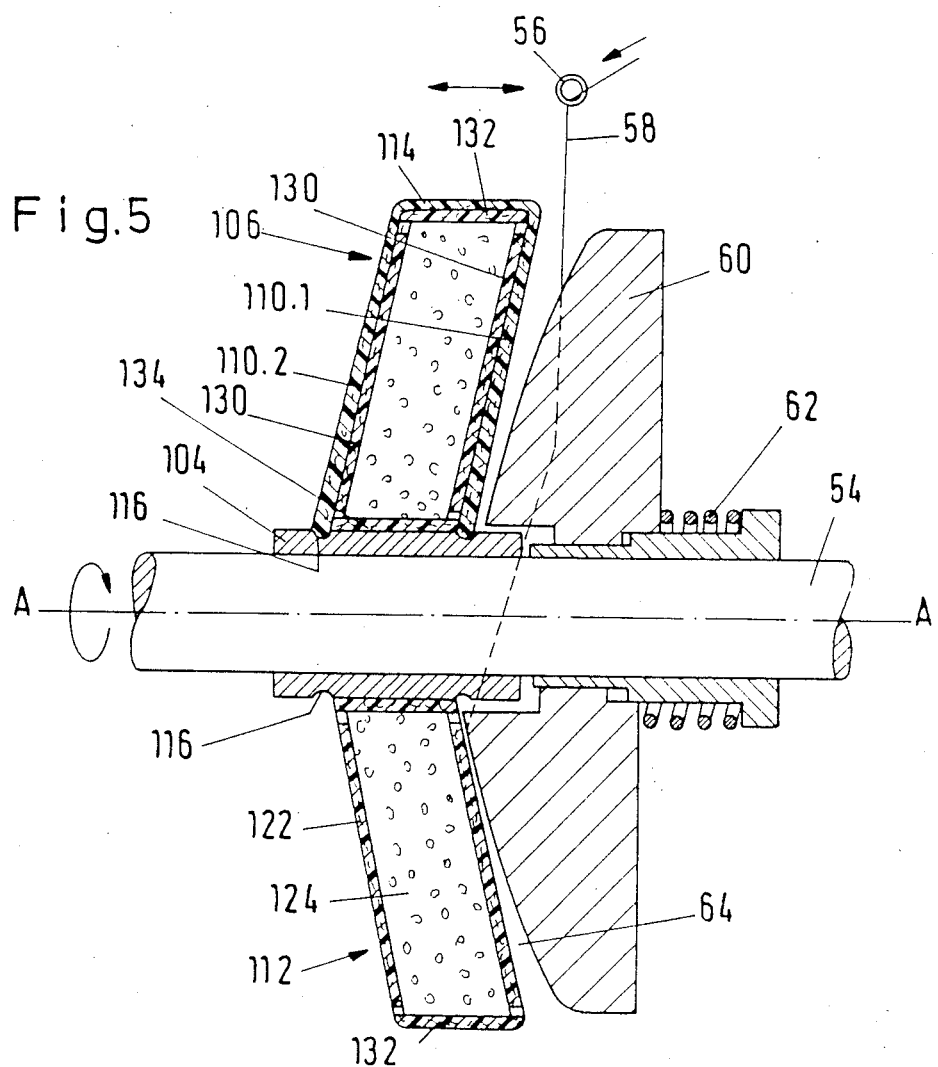
FIG. 5 illustrates a truncated-cone shaped wheel disk, shown in the lower cross-section at the beginning and, in the upper cross-section, at the end of the surface layer-winding process.

The winding of the inner core 12 with the surface layer laminate 14 is clearly illustrated in FIG. 5, in light of an embodiment, whereby the inner core has a trapezoidal-shaped cross section. In this manner, the wheel tire is displaced axially from the hub, so that the wheel disk for a rail wheel has a truncated-cone shaped design. The component parts, corresponding to the first embodiment, are each indicated by a reference symbol which is greater by 100 than the corresponding part illustrated in FIGS. 1-3. The inner core 112 is manufactured, for the most part, in the same way as the inner core 12, apart from the fact, that the winding laminate cut shown in FIG. 3a, as well as the parting planes between the foam plastic pieces and separator pieces of the winding mandrel, must be modified, and the hollow cases 122 must be positioned and jointly hardened in a form tool, corresponding to the trapezoidal form of the inner core 112.

Figure 1A:
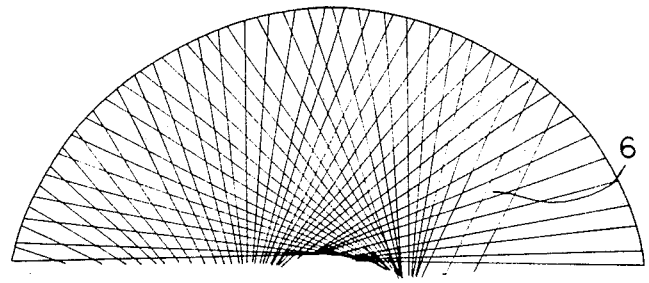
FIG. 1a shows the fiber orientation in the surface layers of the wheel disc.

After the inner core 112 is bonded to the hub 104 between the circular grooves 116, it is attached, together with the hub, to a mandrel 54 and continuously wound with the surface layer laminate 114, with a fiber thread 58, which runs through a thread eyelet 56, in the form of a resin-impregnated fibrous composite roving. The thread eyelet 56 is controlled kinematically, in a way so that the endless thread 58 is placed in the circular grooves 116 with a looping angle, which can be variably preselected, whereby the winding plane is cyclically shifted after each looping of the thread, so that the endless thread 58 runs from the looping area, on the one side of the inner core 112, radially outwards and over the external lateral cylindrical surface of the inner core 112, and from there, again tangentially to the hub 104, inwards to the looping area, on the other side of the inner core 112. See FIG. 1a. When the inner core 112 is wound, in this manner, with the surface layer laminate 114, uniformly and in the desired thickness, and after the surface layer laminate 114 has hardened, the wheel tire 8 is installed and the rail wheel is then complete.

Unlike the rectangular inner core 12 in the cross-section of the embodiment illustrated on FIGS. 1-3, an additional security measure is provided in the case of the truncated-cone shaped wheel disk 106 shown in FIG. 5, in that the endless thread 58 is properly positioned on the side surface of the inner core 112, which has its inner circumference reclined with respect to its outer circumference. This is the right core side surface, in the sense of FIG. 5. For this purpose, a slip cone 60 is arranged on the mandrel 54 and is pressed axially by a compression spring 62, towards the inner core 112, and defines, jointly with the inwardly reclined core side surface, a V-shaped, narrowing winding gap 64, which is rotationally symmetrical with respect to the hub 104. This accomplishes that the endless thread 58 and, thereby, the surface layer laminate 114, is deposited on the inwardly reclined core side surface, thus in the area of the surface layer 110.1, in a manner so that it provides a perfect fibrous structure which contacts, without gaps, the profile side walls 130. As the wall thickness of the surface layer laminate 114, in the area of the hub 104 is increased, the slip cone 60 pushes itself back opposite the direction of the spring tension, so that the winding gap 64 maintains a uniformly-good thread guidance effect during the entire winding process.

What is claimed:

1. In a rail wheel including a wheel hub, a wheel tire and a wheel disk, which wheel disk rigidly joins the wheel hub and the wheel tire and comprises a fibrous composite type of construction including two external fibrous composite surface layers and a relatively light inner core which transmits sheering force, arranged between said surface layers, an improvement wherein the inner core comprises sheer resistant fibrous composite profile sections having a longitudinal direction, each of said profile sections extending radially between the wheel hub and the wheel tire and including web portions disposed perpendicularly to the surface layers and profile side walls formed in one piece on longitudinal edges of the web portions with a continuous fibrous structure, the profile side walls being coupled with the surface layers to transmit forces, the profile sections having an intersecting fibrous orientation, slanted at an angle to the longitudinal direction of the sections.

2. The rail wheel of claim 1, wherein the fibrous composite profile sections are each provided with single piece segment extensions bordering on each of outer and inner rims of the inner core.

3. The rail wheel of claim 2, wherein said fibrous composite profile sections are disposed adjacently in the circumferential direction of the rail wheel to form pairs of fibrous composite profile sections, the segment extensions of the profile sections forming a pair being joined together, in the circumferential direction of the inner core to form a single piece hollow case, a cross-section of said hollow case comprising a pie shape.

4. The rail wheel of claim 3, wherein the single-piece hollow cases formed by said pairs of fibrous composite profile sections are arranged in close side-by-side relation in the circumferential direction of the inner core and are bonded to each other.

5. The rail wheel of claim 3 wherein the profile side walls each have a width that increases in the radial direction of the inner core and which extends to a plane disposed radially through a center of the hollow case.

6. The rail wheel of claim 3 wherein each of the hollow cases comprises a winding core in form of a foam plastic filling.

7. The rail wheel of claim 1 wherein the segment extensions and the surface layers are bonded to an inner surface of the wheel tire and positively coupled to the wheel tire in the axial direction in a non-slip connection.

8. The rail wheel of claim 7 and further comprising a multisectional fibrous composite ring which is engaged in, and is bonded to, a circular groove formed in the wheel tire to provide said non-slip connection in the axial direction, said multi-sectional fibrous composite ring including a ±45 degree angle fibrous orientation.

9. The rail wheel of claim 8 wherein the fibrous composite ring comprises a fibrous layer construction tapering towards its inner circumference.

10. The rail wheel of claim 1 wherein the surface layers are formed in one piece as a wound fibrous composite laminate which laminate extends over side surfaces of the inner core and an outer rim surface of the inner core, said laminate having a fibrous orientation which winds around the hub and runs from the hub tangentially outwards.

11. The rail wheel of claim 10 wherein the fibrous composite laminate is fixed to the hub in groove-like depressions formed in the hub whereby said fibrous composite laminate is axially anchored at both sides of the inner core in a non-slipping manner.

12. The rail wheel of claim 1 wherein the wheel tire is displaced axially relative to the hub and the inner core is formed to a truncated-cone shape and further, wherein one of the surface layers is wound through the use of a slip cone, said slip cone being spring-loaded axially in the direction of the inner core to form and define jointly with the inner core a V-shaped, narrowing winding gap.

13. A method of manufacturing an inner core of a wheel disk of a rail wheel, wherein said wheel disk rigidly joins a wheel hub and a wheel tire of the rail wheel, comprising the steps of:
  providing a winding mandrel;
  arranging, in an alternate sequence, a plurality of foam plastic-winding cores and a plurality of separator pieces, on said winding mandrel, each one of said plurality of separator pieces being arranged on said winding mandrel between two plastic-winding cores;
  forming a winding laminate around said plurality of foam plastic-winding cores and alternate plurality of separator pieces;
  cutting said winding laminate, in the region of said separator pieces, along preselected cut lines;
  thereafter, removing the winding cores and separator pieces from each other and from the winding mandrel;
  forming further preselected cut lines to define profile-wall-forming sections of said winding laminate extending from each side edge of said winding cores, upon cutting of said winding laminate; and
  folding said profile-wall-forming sections onto the end faces of said winding cores after removal of said seperator pieces to provide profile side walls on each side of each one of the plurality of winding cores.

14. The method of claim 13 and further comprising the step of joining a plurality of the cut and removed winding cores, with the winding laminate in an unhardened state, to provide an inner core, and thereafter jointly hardening the winding laminate.

* * * * *